United States Patent [19]

Lehnert et al.

[11] 4,268,155

[45] May 19, 1981

[54] PHOTOGRAPHIC APPARATUS FOR PLATE THERMOGRAPHY

[75] Inventors: Günther Lehnert, Leverkusen; Rainer Schiffer, Bergisch-Gladbach, both of Fed. Rep. of Germany

[73] Assignee: Bayer Aktiengesellschaft, Leverkusen, Fed. Rep. of Germany

[21] Appl. No.: 48,297

[22] Filed: Jun. 13, 1979

[30] Foreign Application Priority Data

Jul. 1, 1978 [DE] Fed. Rep. of Germany ... 7819870[U]

[51] Int. Cl.³ .............................................. G03B 17/00
[52] U.S. Cl. ....................................... 354/293; 354/80
[58] Field of Search ..................................... 354/80–82, 354/293, 126; 355/39, 21, 63; 352/243; 250/316

[56] References Cited

FOREIGN PATENT DOCUMENTS

| 1380325 | 10/1964 | France | 354/293 |
| 2356966 | 1/1978 | France | 354/126 |

*Primary Examiner*—John Gonzales
*Attorney, Agent, or Firm*—Sprung, Felfe, Horn, Lynch & Kramer

[57] ABSTRACT

A photographic apparatus for plate thermography comprising a support having a holder for a thermographic plate at one end and a photographic camera with flashlight at the opposite end. An adaptor designed to be mounted on the support and locked to it is provided for the attachment of different camera systems. Bus bars or contact rails are provided both on the support and in the adaptor so that when the adaptor is placed in position, electrical contact is established between the flashlight and a source of current on the support.

5 Claims, 3 Drawing Figures

PHOTOGRAPHIC APPARATUS FOR PLATE THERMOGRAPHY

BACKGROUND OF THE INVENTION

The invention relates to a photographic apparatus for plate thermography, comprising a support having a holder for a thermographic plate at one end, a photographic camera with flashlight or flash at the opposite end and a handle on the support. This apparatus may be used for recording and documenting thermal anomalies in the human body. Suitable thermographic plates have been described, e.g. in British Pat. No. 1,376,611. Plate thermography has been found to be useful for the diagnosis of certain diseases, for example, in particular the early detection of tumours, phlebitis and blockage of blood vessels.

In practice, it is frequently necessary to change the camera system used for recording the thermographic images. Some cases, for example, require rapid documentation while in other cases it is important to obtain a very accurate recording true in colour and detail as well as long term stability of the images. The use of an instant image camera is suitable for the first mentioned case whereas only a high quality camera with reversal film (diafilm) is suitable for the second case.

SUMMARY OF THE INVENTION

It is therefore an object of the present invention to provide a photographic apparatus for plate thermography which is flexible in its use for different camera systems and provides for rapid and simple change from one camera system to another.

According to the present invention, there is provided a photographic apparatus for plate thermography, comprising a support having a holder for a thermographic plate at one end and a photographic camera with flashlight at the opposite end, and a handle on the support, characterised in that an adaptor is provided for the attachment of different camera systems, which adaptor is designed to be mounted on the support and locked to it, and in that bus bars or contact rails are arranged on the support and in the adaptor so that electrical connection is established between the flashlight and a battery in or on the support when the adaptor is mounted in position.

In a preferred embodiment, the support comprises a hollow section and the bus bars are arranged in the cavity of this section.

The battery is advantageously accommodated in the handle on the support. The handle is preferably situated at the centre of gravity of the whole apparatus.

The advantages achieved with the invention lie in the fact that the apparatus can easily be adapted to a different camera system by a simple manipulation and the supply of current to the flashlight is automatically established at the same time.

An embodiment of the invention given by way of example is described in more detail below with reference to the accompanying drawings, in which:

DETAILED DESCRIPTION OF THE INVENTION

Figure 1:
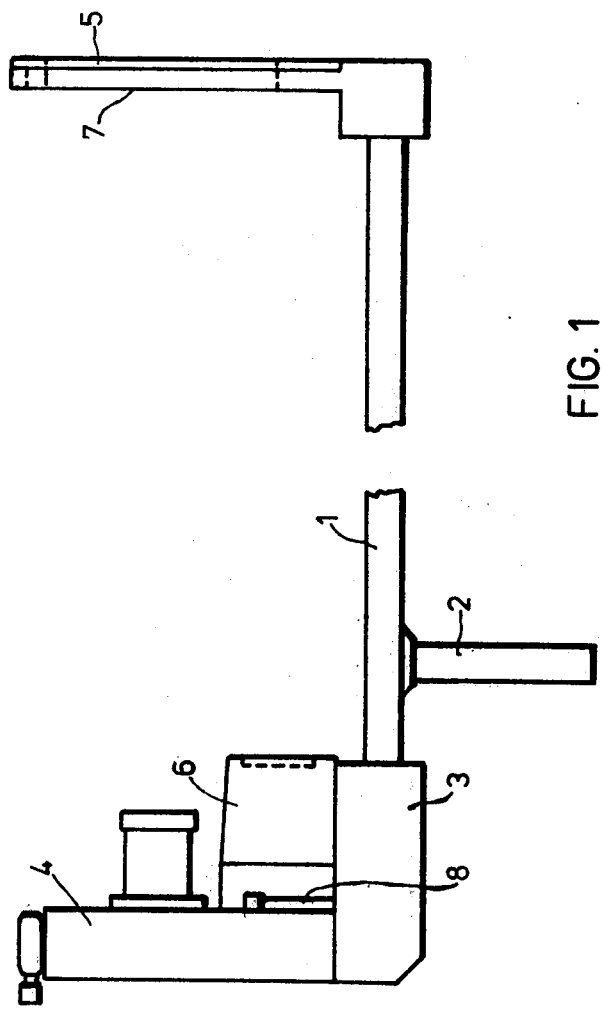
FIG. 1 is an overall view of a photographic apparatus.

The apparatus shown in FIG. 1 basically comprises a support 1 with handle 2, a replaceable adaptor 3 for a camera 4, and a holder 5 for a thermographic plate. A conventional flashlight device 6 is connected with the camera 4. The camera 4 is arranged so that its optical axis is perpendicular to the plane 7 of the thermographic plate. A lock by which the adaptor is fixed to the support 1 is released by operating a lever 8, and the camera 4 can then be removed from the support 1 together with the flashlight 6 and adaptor 3. The handle 2 is situated at the centre of gravity of the whole apparatus. This enables the operator to hold the apparatus in one hand without tilting it.

Figure 2:
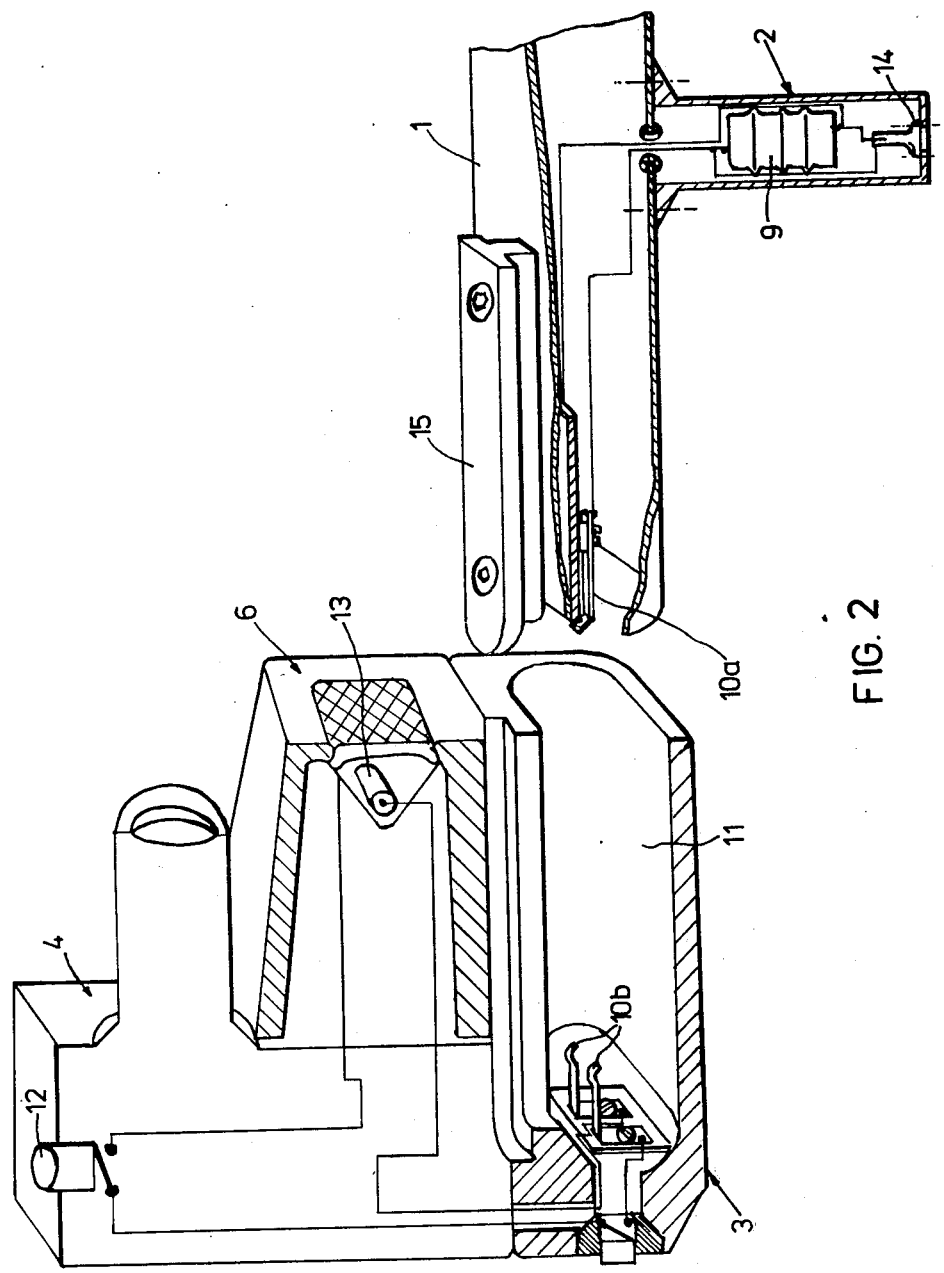
FIG. 2 shows an adaptor with a camera and a partial view of a support with a current supply.
Figure 3:
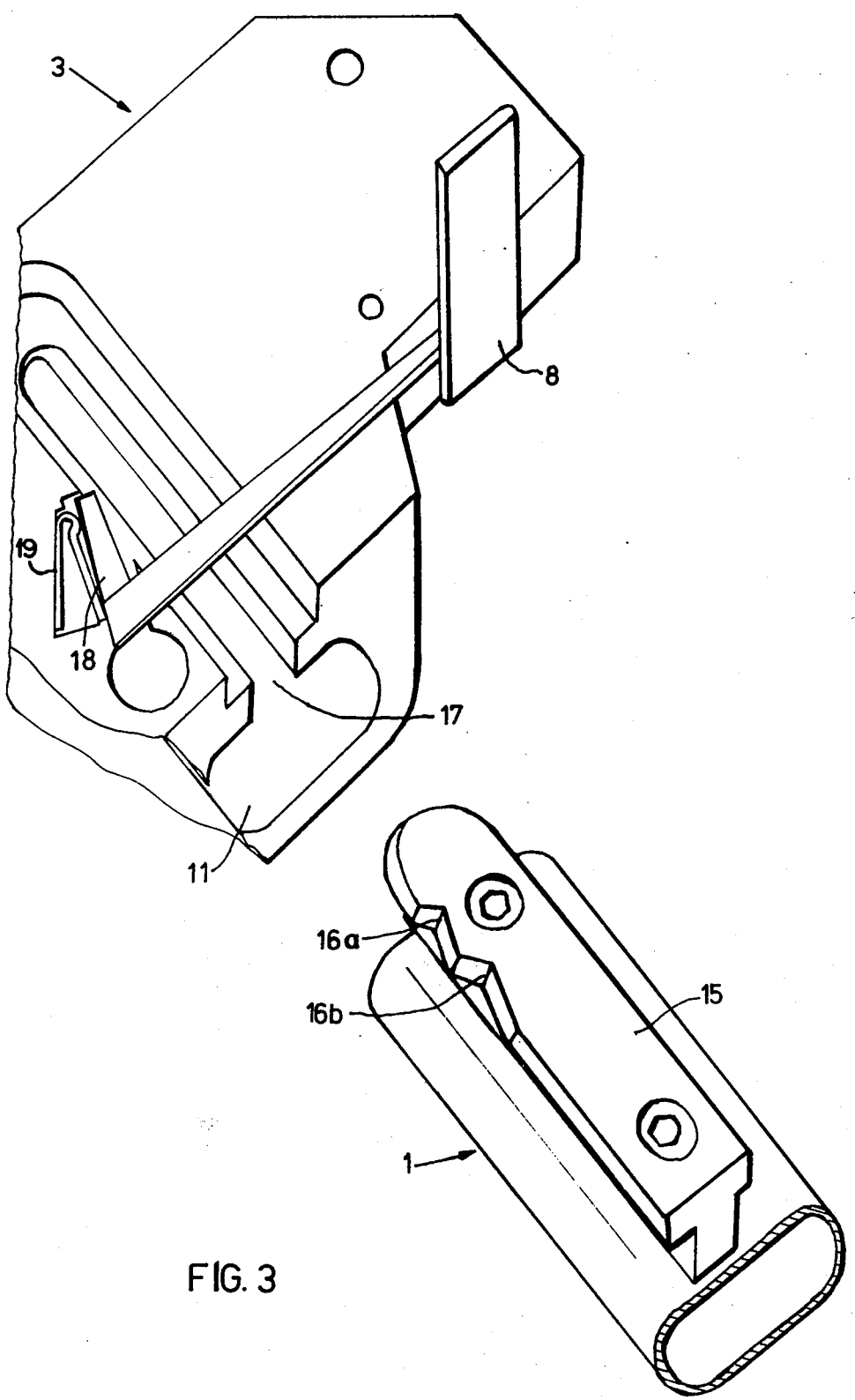
FIG. 3 shows an arrangement for locking the adaptor.

The support 1 comprises a rectangular hollow section with rounded off edges (see FIGS. 2 and 3). An accumulator or battery 9 provided as a source of energy for the flashlight 6 is accommodated in the handle 2. Its terminals are connected to two bus bars 10a in the support 1. The adaptor 3 has a recess 11 designed to accommodate the hollow section. Bus bars 10b of the adaptor are arranged at one end of this recess. When the adaptor 3 is pushed over the support 1 so that the support comes to lie inside the recess 11, electrical contact is established between the bus bars 10b and the bus bars 10a. The flashlight 6 is thereby connected with the accumulator 9 so that a flash tube 13 can be ignited by operating a release 12.

The connections for the accumulator 9 are carried to the outside in the form of plug sockets 14 at the lower end of the handle 2. They serve as connections for a charging device for recharging the accumulator 9. To recharge the battery, the apparatus is simply placed with its handle 2 on a stand which is connected to the charging device. As the apparatus is placed on the stand, a switch disconnects the current from the flashlight 6.

FIG. 3 shows the mechanical device for locking the adaptor 3 to the support 1. It comprises a T-shaped section 15 with catches 16a and 16b fixed to the end of the support 1 and a corresponding recess 17 on the adaptor, with a locking pawl 18 and spring 19. When the adaptor 3 is pushed over the support 1, the locking pawl 18 snaps into the recesses 16a, 16b of the T-section 15. The adaptor 3 is locked provisionally by engagement with the first recess 16a and finally by engagement with the second recess 16b. The lock can be released by moving the lever 8 against the pressure of the spring 19.

We claim:

1. Photographic apparatus for plate thermography, comprising an elongated support receptive of electrical energy and having a handle, a holder for a thermographic plate at one end and means for mounting a photographic camera with flashlight at the opposite end comprising an adaptor for the attachment of different camera systems and means for simultaneously releasably connecting electrically and mechanically the adaptor on the support in response to relative sliding movement of the support and adaptor along the longitudinal axis of the support comprising bus bars receptive of the electrical energy and arranged on the support and bus bars in the adaptor, where electrical connection is established between the flashlight and the electrical energy when the adaptor is mounted in position.

2. Photographic apparatus according to claim 1, wherein the support comprises a hollow section and the bus bars are arranged inside the hollow section.

3. Photographic apparatus according to claim 1 or claim 2, further comprising a battery accommodated in the handle for supplying the electrical energy.

4. Photographic apparatus according to claim 1, wherein the handle is situated at the centre of gravity of the support.

5. Photographic apparatus according to claim 1, wherein the connecting means comprises a connecting member on the support, a recess in the adaptor configured to slidably receive the connecting member in the longitudinal direction and releasable locking means disposed on the adaptor and support for engaging when the connecting member is fully inserted in the recess to maintain the support and adaptor in an assembled condition.

* * * * *